United States Patent Office

2,985,562
EFFERVESCENT COMPOSITIONS

Ruth Millard, Baltimore, and Clemens A. Balmert, Catonsville, Md., assignors to Warner-Lambert Pharmaceutical Company, Morris Plains, N.J., a corporation of Delaware No Drawing. Filed Mar. 27, 1958, Ser. No. 724,263

20 Claims. (Cl. 167—82)

This invention relates to the production of effervescent compositions and, more particularly, to the production of free-flowing effervescent compositions which are suitable for use in tablet making operations employing compression molding procedures.

An object of this invention is to provide new and improved effervescent compositions which are particularly adapted for use in tablet making operations, and which are readily capable of yielding shaped tablets by compression molding with a minimum of processing difficulties. The tablets obtained in accordance with this invention are not only sufficiently hard to be further processed but can be hardened appreciably by subsequent treatment.

Another object of this invention is the preparation of shaped tablets of effervescent compositions which are stable, and which dissolve rapidly with the production of a lively and vigorous effervescence when added to water.

A further object of this invention is the production of free-flowing effervescent mixtures suitable for use as such or in the preparation of the improved effervescent tablets of this invention, which free-flowing mixtures are obtained without any marked loss of effervescence during the processing operations employed in forming said free-flowing compositions.

Other objects of this invention will appear from the following detailed description:

In the production of effervescent compositions in the form of free-flowing mixtures or in the form of mixtures suitable for the production of compress tablets, the basic effervescent mixtures, when employed for medicinal or internal application, involve the use of mixtures of alkali metal carbonates or bicarbonates, such as the sodium, potassium or calcium compounds, singly or in combination, together with a non-toxic dry organic acid such as tartaric, citric or malic acid, or with a mixture of these acids.

To these basic effervescent mixtures various therapeutic and flavoring ingredients or additional effervescent ingredients may be added depending upon the specific type of product desired. When the effervescent mixture is added to water the acid or acids present react with the carbonate or bicarbonate or mixture of these present in the mixture, and the release of the gaseous carbon dioxide formed as a product of this reaction produces the desired effervescence.

Effervescent compositions for applications other than internal medicinal use can be prepared and may be employed as dental cleansers, as bath salts and for other analogous uses where not only the effervescent ingredients mentioned above may be used but other as well.

To form tablets from an effervescent mixture such as that described above, the mixture must usually be in granular form in order that it will be sufficiently free-flowing to be easily fed to the die cavity of the tableting machine employed for shaping the tablets. Powders do not flow freely and these powders must be granulated in some convenient fashion. The usual methods of preparing such free flowing granulations include the heat fusion method, the use of steam or water injection or the use of a double granulation method.

The heat fusion method consists of mixing the particular alkali metal carbonate or bicarbonate, or mixture, with the desired organic acid or combination of acids, which mixture should include monohydrated citric acid in an amount of from about 8 to 30% of the total acid present, placing the mixture in a suitable container and heating until the water of crystallization in the monohydrated citric acid present is released. This treatment causes a partial reaction and results in the formation of a plastic mass which, when broken down into coarse granules and then screened, dried and lubricated can be compressed into tablets.

The steam or water injection method of granulation is similar to the heat fusion method except that monohydrated citric acid does not have to be employed since the required moisture is added either in the form of steam or as water, which is sprayed or injected into the mixture as it is agitated. Heat is not essential in this method of forming the plastic mass which, after being broken up into coarse granules, is subsequently screened and dried. When employed for the production of tablets the granulated mixture is usually lubricated and the lubricated granulation compressed into tablets.

The double granulation method consists of preparing granules of the alkali metal carbonate or bicarbonate by moistening the latter with a solution of a binding material such as sugar, acacia, gelatin or lactose, screening the moist mixture to form granules and then drying the moist granules. A separate granulation is made in a like manner of the acid components. The medicinal or flavoring ingredients are then incorporated into either granulation or divided between said granulations, and the two granulations are then mixed in the proper formula proportions. For tablet formation by compression, the granulation mixture is lubricated prior to compression.

When the granulations obtained by the methods described are then tableted, the tablets formed are not always sufficiently hard for handling in subsequent packaging operations and, in general, are easily chipped, flaked apart or cracked. When greater pressure is employed in compression, other physical defects, such as capping, may occur. Not only are chipped, flaked or cracked tablets unmarketable but, in addition, when the breakage occurs during packaging operations, the tablet feeding and packaging mechanism is easily clogged and the frequent jamming greatly impairs the efficiency of the packaging operation.

It has now been found that improved free-flowing granulated effervescent compositions comprising an alkali metal carbonate or alkali metal bicarbonate, or a mixture of said compounds and an organic acid, such as tartaric acid, citric acid or malic acid, or mixtures of these acids, may be obtained by the usual granulating procedures if a small amount of a monocarboxylic amino acid is incorporated therein. Preferably, citric acid is employed to comprise at least part of the organic acid in the composition. All of the citric acid may be in the anhydrous form. By this process, not only are highly satisfactory free-flowing granulated mixtures formed, but these granulations may be employed very satisfactorily in the production of tablets by compression molding procedures. Not only are the tablets formed from the granules so obtained of a satisfactory degree of hardness for further processing but, on subjecting these tablets to a heat treatment following the compression molding operation, the degree of hardness of the molded tablets is substantially increased without loss of solution speed and the difficulty of chipping, capping or splitting of the tablets is substantially eliminated.

In forming the improved free-flowing effervescent mixtures of this invention, we preferably employ from about 0.5 to about 3.0% by weight of the desired amino acid in the composition. Such amino acids as glycine or alanine may, for example, be satisfactorily incorporated in the mixture of dry, powdered ingredients employed. The amino acid employed should be a mono-carboxylic acid. The composition to which the amino acid is added should be of relatively fine particle size and preferably should not include any appreciable proportion of particles over 40 mesh in size. The mixture thus formed is then heated to a temperature between 60 and 120° C. and held at this temperature for from about 15 to about 35 minutes. The mixture becomes slightly plastic under these conditions. Following this heat treatment, the mixture is cooled and then screened. The freely-flowing screened mixture thus obtained forms the basic mixture to which any desired medicinal agent, flavoring agent, color or tableting lubricant may be added.

For the production of free-flowing granules which are to be used as such without tableting, and granules of 5 to 8 mesh size are desired, the acid should include about 3% by weight of monohydrated citric acid and the mixture should be reduced to at least 100 mesh particle size before heating.

Where the effervescent composition is formed of a mixture of an alkali metal bicarbonate, such as sodium bicarbonate, and citric acid, the precise stoichiometric ratio of citric acid to sodium bicarbonate in the basic effervescent formulation is 192 parts by weight of anhydrous citric acid to 252 parts by weight of sodium bicarbonate, with three mols of sodium bicarbonate being necessary to neutralize each mol of citric acid. In the case of tartaric acid, only two mols of sodium bicarbonate are necessary to neutralize each molecule of tartaric acid. When a somewhat tart taste is desired in the product the acid is employed in excess. An excess of up to about 35% by weight of that theoretically required may be employed in such instances. Aside from this, the use of an excess of acid is not necessary and entirely satisfactory formulations are obtained where the exact stoichiometric ratio is employed. An excess of the alkali metal bicarbonate may also be desired where it is advantageous to maintain the formulation on the alkaline side, e.g. where aspirin is used and solubilization dictates that alkaline conditions be employed.

With respect to the heat treatment of the tablets formed from the free-flowing effervescent mixtures described, heating the tablets to a temperature of 70 to 90° C. for about one to two hours is usually sufficient to impart the desired degree of hardness to the shaped tablets.

In order further to illustrate this invention but without being limited thereto the following examples are given:

*Example 1*

The following dry powdered ingredients are thoroughly mixed in the proportions given below, the particle size of the ingredients being from 40–200 mesh:

| | Percent |
|---|---|
| Citric acid anhydrous | 63.73 |
| Sodium bicarbonate | 34.71 |
| Glycine | 1.56 |

The mixture obtained is spread in broad shallow trays and heated for 28 minutes in an oven maintained at 115° C. The trays are then removed and the contents allowed to cool to room temperature. The fused mass is then removed from the trays and passed through an oscillating or rotary granulator equipped with a 10 x 10 mesh stainless steel screen. The granulated mass is then dried for 90 minutes in an oven maintained at 70° C.

From the above basic mixture is prepared the following blend:

| | Percent |
|---|---|
| Basic mixture | 88.69 |
| Sucaryl | 6.21 |
| Saccharin | 1.40 |
| Orange flavor | 2.71 |
| Orange color | 0.26 |
| Vitamin C | 0.74 |

The mixture is thoroughly blended and compressed into tablets by a rotary tableting machine. The tablets produced are ¾ of an inch in diameter, 5/16 of an inch in thickness, weigh 2.25 grams and have a hardness of 3–6 on the Strong Cobb hardness scale. After heating at 70° C. for 90 minutes the tablets reach a hardness of 20–30 on this scale.

*Example 2*

The following dry powdered ingredients are thoroughly mixed in the proportions given below. The particle size of the ingredients being from 40–200 mesh:

| | Percent |
|---|---|
| Citric acid anhydrous | 63.55 |
| Sodium bicarbonate | 34.61 |
| dl-Alanine | 1.85 |

After thorough blending in a ribbon mixer 2.0% or 2 grams of water per 100 grams of powder mix is added to the blender by means of a fine spray while the mix is being agitated. After the water has been added the blender is permitted to operate for an additional 3–5 minute period. The wet mass is then removed and put through an oscillating or rotary granulator equipped with a 10 x 10 mesh stainless steel screen. The granulated mass is then dried in an oven maintained at 70° C. for 90 minutes.

In this procedure identical quantities of the granulated mixture are employed as were used in Example 1 with the same quantities of basic mix, Sucaryl, etc. The tablets obtained exhibit the same increase in hardness on the same heat treatment.

*Example 3*

The following dry powdered ingredients are thoroughly mixed in the proportions given below, the particle size of the ingredients being from 40–200 mesh:

| | Grams |
|---|---|
| Citric acid anhydrous | 768.3 |
| Sodium bicarbonate | 1,008.3 |
| Sucaryl | 180.0 |
| Glycine | 135.0 |

After thorough mixing the blend is sprayed with 20 cc. of water while the mixture is still being agitated. Following a post mix period of 3–5 minutes the material is passed through a 10 x 10 mesh stainless steel screen. The granulated mass is then dried for 90 minutes at 70° C. To the dried granulation is added the following:

| | Grams |
|---|---|
| Acetyl p-amino phenol | 135 |
| Methapyrilene | 9.3 |
| Ascorbic acid | 13.5 |
| Red color | 0.9 |

After thorough blending of the above mixture the material is fed to a rotary tablet press. The tablets produced are 1 inch in diameter, 5/16 of an inch thick, and weigh 3.25 grams. The average hardness of the tablets thus produced is 8–10 Strong Cobb units. The tablets are then heated to 90° C. for 90 minutes. After the heating period the tablets have a hardness of from 20–30 units on the Strong Cobb scale.

*Example 4*

The following dry ingredients are thoroughly mixed in the proportions given below, the particle size of the ingredients being from 20 to 200 mesh:

| | Parts by weight |
|---|---|
| Citric acid anhydrous | 20.0 |
| Sodium bicarbonate | 10.5 |
| Glycine | .5 |

The mixture obtained is spread in broad shallow trays and heated to a temperature of 80° C. for 35 minutes. The mixture is then cooled and put through a 10 mesh screen on an oscillating granulator. The free-flowing composition obtained comprises the basic mixture and can be used in the preparation of tablets by blending the following:

| | Parts by weight |
|---|---|
| Basic mixture | 31.0000 |
| Saccharin | .5000 |
| Sodium cyclamate (Sucaryl) | 2.4375 |
| Dry flavor | 1.0000 |
| Color | .0625 |
| | 35.0000 |

The whole is thoroughly mixed after being lubricated with 0.5% light mineral oil or with cotton seed oil. The lubricated mixture is then fed to a tablet machine, preferably a rotary type, equipped with 27/32 dies and punches and 35 gram tablets ⅗₆″ in thickness are punched out. The tablets formed have a hardness of from 4 to 6 on the Strong Cobb scale. After heating the tablets to 90° C. for 1 hour the tablets reach a hardness of from 12 to 15 on this scale. The tablets taken directly from the tablet machine dissolve in water at 50° F. in about 60 seconds and, after the heat treatment, dissolve in 70 seconds.

*Example 5*

The following mixture is blended:

| | Parts by weight |
|---|---|
| Basic mixture (from Example 4) | 31.000 |
| Sodium bicarbonate | 16.500 |
| Acetanilide | 2.5 |
| | 50.00 |

After being mixed thoroughly the mixture is fed to a rotary tablet machine equipped with 1″ dies and punches and 50 grain tablets approximately ⅗₆″ thick are punched. The tablets obtained have a hardness of from 5 to 8 on the Strong Cobb scale. After heating the tablets to 90° C. for 1 hour the tablets reach a hardness of from 15 to 20 on this scale. The untreated tablets dissolve in water at 50° F. in 50 seconds and after the heat treatment are found to dissolve in 60 seconds.

*Example 6*

The following dry powdered ingredients are thoroughly mixed in the proportions given below, the particle size of the ingredients being from 40 to 200 mesh.

| | Parts by weight |
|---|---|
| Glycine | 1.00 |
| Tartaric acid | 5.00 |
| Malic acid | 5.00 |
| Citric acid anhydrous | 11.56 |
| Sodium bicarbonate | 16.44 |
| Sodium carbonate anhydrous | 2.00 |
| Potassium bicarbonate | 4.00 |
| Sodium bromide | 5.00 |
| | 50.00 |

The mixture obtained is spread in broad shallow trays and heated to a temperature of 110° C. for 35 minutes. The mixture is then cooled and put through an 8 mesh screen on an oscillating granulator. A free-flowing granular composition is obtained which can be submitted to a heat treatment at 120° F. for 1 hour for further stabilization.

If the granulation is to be punched into tablets, a 10 mesh screen is used on the oscillating granulator and the free-flowing composition suitably lubricated and fed to a tablet machine, preferably of the rotary type and provided with suitable dies and punches. When 50 grain tablets are prepared in this way with 1″ dies, the tablets are approximately ⅗₆″ thick, with a hardness of from 7 to 10 on the Strong Cobb scale. After heating to 70° C. for 1 hour the tablets reach a hardness of from 15 to 25 on this scale. The tablets from the tablet machine dissolve readily in 50° F. water in about 50 seconds and, after the heat treatment, dissolve in 60 to 70 seconds.

We claim:

1. Process for the production of a free-flowing composition reactive in aqueous solution to produce effervescence, which comprises forming a powdered mixture which includes a member of the group consisting of an alkali metal carbonate and an alkali metal bicarbonate, at least one non-toxic organic acid, and an amino acid, heating the resulting powdered mixture to a temperature of 60 to 120° C. and then separating the treated mixture into a mixture of free-flowing discrete particles.

2. An effervescent composition obtained in accordance with the process of claim 1.

3. Process for the production of a free flowing composition reactive in aqueous solution to produce effervescence, which comprises forming a powdered mixture including an alkali metal bicarbonate, at least one non-toxic organic acid including citric acid, and an amino acid, heating the resulting powdered mixture to a temperature of 60 to 120° C. and then separating the treated mixture into a mixture of free-flowing discrete particles.

4. Process in accordance with claim 3 wherein the alkali metal bicarbonate is sodium bicarbonate.

5. Process in accordance with claim 3 wherein the alkali metal bicarbonate is potassium bicarbonate.

6. Process in accordance with claim 3 wherein the citric acid contains a minor proportion of citric acid monohydrate.

7. Process in accordance with claim 3 wherein the organic acid is tartaric acid.

8. Process in accordance with claim 3 wherein the amino acid is glycine.

9. Process in accordance with claim 3 wherein the amino acid is alanine.

10. Process in accordance with claim 3 wherein the bicarbonate is sodium bicarbonate and the organic acid is a mixture of anhydrous citric acid and hydrated citric acid, said powdered mixture containing from 0.5 to 3.0% of glycine.

11. Process in accordance with claim 3 wherein the bicarbonate is sodium bicarbonate and the organic acid is a mixture of anhydrous citric acid and hydrated citric acid, said powdered mixture containing from 0.5 to 3.0% of alanine.

12. An effervescent composition obtained in accordance with the process of claim 3.

13. Process for the production of a free-flowing composition reactive in aqueous solution to produce effervescence, which comprises forming a powdered mixture including sodium bicarbonate, citric acid and from 0.5 to 3.0% on the weight of the mixture of glycine, heating the powdered mixture to a temperature of 60 to 120° C. and then separating the mixture into a mixture of free-flowing discrete particles.

14. Process for the production of effervescent tablets, which comprises forming a powdered mixture which includes a member of the group consisting of an alkali metal carbonate and alkali metal bicarbonate, at least one non-toxic organic acid, and an amino acid, heating the resulting powdered mixture to a temperature of 60 to 120° C., separating the treated mixture into a mixture of free-flowing discrete particles, adding a lubricant to said particle mixture and then forming tablets from said lubricated mixture by compression.

15. Process for the production of effervescent tablets, which comprises forming a powdered mixture including an alkali metal bicarbonate, a mixture of anhydrous citric acid containing a minor amount of citric acid monohydrate, and an amino acid, heating the resulting powdered mixture to a temperature of 60 to 120° C., separating the treated mixture into a mixture of free-flowing discrete particles, adding a lubricant to said particle mixture and then forming tablets from said lubricated mixture by compression.

16. A method of producing an effervescent tablet having sufficient hardness to withstand packaging without chipping, flaking or cracking which comprises forming a powdered mixture which includes a member of the group consisting of an alkali metal carbonate and an alkali metal bicarbonate, at least one organic acid and between 0.5 and 3 percent by weight of an amino acid, heating the resulting powdered mixture to a temperature of 60 to 120° C., separating the treated mixture into a mixture of free flowing discrete particles, adding a lubricant to said particle mixture, forming tablets from said lubricated mixture by compression, and heating said tablets to a temperature of 70° to 90° C. thereby hardening said tablets.

17. A method of producing an effervescent tablet having sufficient hardness to withstand packaging without chipping, flaking or cracking which comprises forming a powdered mixture which includes a member of the group consisting of an alkali metal carbonate and an alkali metal bicarbonate, at least one organic acid and between 0.5 and 3 percent by weight of glycine, heating the resulting powdered mixture to a temperature of 60 to 120° C., separating the treated mixture into a mixture of free flowing discrete particles, adding a lubricant to said particle mixture, forming tablets from said lubricated mixture by compression, and heating said tablets to a temperature of 70° to 90° C. thereby hardening said tablets.

18. A method of producing an effervescent tablet having sufficient hardness to withstand packaging without chipping, flaking or cracking which comprises forming a powdered mixture including sodium bicarbonate, citric acid and between 0.5 and 3 percent by weight of glycine, heating the resulting powdered mixture to a temperature of 60 to 120° C., separating the treated mixture into a mixture of free flowing discrete particles, adding a lubricant to said particle mixture, forming tablets from said lubricated mixture by compression, and heating said tablets to a temperature of 70° to 90° thereby hardening said tablets.

19. A method of producing an effervescent tablet having sufficient hardness to withstand packaging without chipping, flaking or cracking which comprises forming a powdered mixture including potassium bicarbonate, citric acid and between 0.5 and 3 percent by weight of glycine, heating the resulting powdered mixture to a temperature of 60 to 120° C., separating the treated mixture into a mixture of free flowing discrete particles, adding a lubricant to said particle mixture, forming tablets from said lubricated mixture by compression, and heating said tablets to a temperature of 70° to 90° thereby hardening said tablets.

20. Process for the production of a free flowing composition reactive in aqueous solution to produce effervescence, which comprises forming a powdered mixture including potassium bicarbonate, citric acid and from 0.5 to 3 percent on the weight of the mixture of glycine, heating the powdered mixture to a temperature of 60 to 120° C. and then separating the mixture into a mixture of free flowing discrete particles.

References Cited in the file of this patent
UNITED STATES PATENTS 2,032,890     Schoeller _____ Mar. 3, 1936

OTHER REFERENCES

Merck Index, 6th ed., Merck and Co., Rahway, N.J., 1952, pp. 26 and 468

Remington's Practice of Pharmacy, 11th ed., Mack Pub. Co., Easton, Pa., 1956, pp. 368, 369 and 379.